United States Patent
Budde et al.

(10) Patent No.: US 8,004,274 B2
(45) Date of Patent: Aug. 23, 2011

(54) INDUCTIVE POSITION SENSOR

(75) Inventors: Wolfram Budde, Wesel (DE); Andreas Kribus, Bochum (DE); Robert Brands, Dortmund (DE)

(73) Assignee: Elmos Semiconductor AG, Dortmund (DE)

( * ) Notice: Subject to any disclaimer, the term of this patent is extended or adjusted under 35 U.S.C. 154(b) by 343 days.

(21) Appl. No.: 12/097,682

(22) PCT Filed: Dec. 18, 2006

(86) PCT No.: PCT/EP2006/069848
§ 371 (c)(1),
(2), (4) Date: Dec. 3, 2008

(87) PCT Pub. No.: WO2007/068765
PCT Pub. Date: Jun. 21, 2007

(65) Prior Publication Data
US 2009/0224751 A1    Sep. 10, 2009

(30) Foreign Application Priority Data

Dec. 16, 2005  (EP) .................................. 05112329

(51) Int. Cl.
*G01B 7/14* (2006.01)
(52) U.S. Cl. ................................. 324/207.17
(58) Field of Classification Search ........... 324/207.11–207.15, 207.23–207.25
See application file for complete search history.

(56) References Cited

U.S. PATENT DOCUMENTS

| | | | |
|---|---|---|---|
| 5,812,598 A | | 9/1998 | Sharma et al. |
| 5,854,553 A | * | 12/1998 | Barclay et al. ........... 324/207.16 |
| 6,111,402 A | * | 8/2000 | Fischer ................... 324/207.17 |
| 7,443,160 B2 | * | 10/2008 | Wolf ....................... 324/207.25 |
| 2002/0179339 A1 | | 12/2002 | Ely et al. |
| 2005/0030010 A1 | | 2/2005 | Jones et al. |

FOREIGN PATENT DOCUMENTS

| | | |
|---|---|---|
| GB | 2 079 104 | 6/1980 |
| WO | 03/067181 | 8/2003 |
| WO | 2004/072653 | 8/2004 |

\* cited by examiner

*Primary Examiner* — Vinh Nguyen
*Assistant Examiner* — Joshua Benitez
(74) *Attorney, Agent, or Firm* — Renner, Otto, Boisselle & Sklar, LLP (57) ABSTRACT

An inductive position sensor, which in particular is a rotational angle sensor, is provided with two first transmitter units for the generation of two site-dependent first alternating fields having the same carrier frequency, and at least one oscillating circuit arranged in or on an element which may be moved within the alternating field and the position of which is to be determined. The oscillating circuit can be energized by the total alternating field and generates a oscillating-circuit alternating field having the same carrier frequency as the first alternating fields. The position sensor is further provided with at least one receiver unit which receives the oscillating-circuit alternating field, and an analysis unit for determining the phase shift between the oscillating-circuit alternating field and at least one of the two first alternating fields, wherein the two first alternating fields may each be generated by a carrier frequency signal on which substantially identical, substantially 90° phase-shifted modulation signals are modulated. Each carrier frequency signal may be generated by application of a square-wave alternating voltage to the first transmitter units, the repetition frequency of said voltage being equal to the carrier frequency. The modulation signal is a pulse density signal having a pulse density changing over time for generation of a signal development having a substantially sine or cosine wave form. The square wave signal is applied to the first transmitter units for the duration of the pulse density signal.

20 Claims, 11 Drawing Sheets

Desired modulation signal

Sign of the modulation signal, as sgn(f(t))

Enlarged time segment for the following graphs

Pulse density of modulated modulation signal PDS(f(t))

Continous square-wave alternating-field signal with carrier frequency F,R(t)

Continous carrier frequency when controlled with full pulse width $TF_{100}(t)$

Continous carrier frequency when controlled with half pulse width $TF_{50}(t)$

Voltage $U_{SE}(T)=TF_{50}(t)*PDS(f(t))$ applied to transmitter unit

Fig.10: Ideal modulation signal(A) and frequency spectrum(B) thereof

Fig.11: Conventional modulation signal (square-wave modulation) (carrier signal not illustrated) and appertuning frequency spectrum

Fig.12: Frequency spectrum for rectangular modulation signal, represented at an enlarged scale in the region around the carrier frequency

Fig.13: Improved modulation signal

Fig.14: Frequency spectrum for an improved modulation signal, represented at an enlarged scale in the region around the carrier frequency

Fig.15: Representative of the class of novel pulse-density signals, and frequency spectrum thereof

Fig.16: Frequency spectrum represented at an enlarged scale in the region of the carrier frequency

Fig.17: Representative of the class of novel, widened pulse-density signals, and frequency spectrum thereof.

Fig.18: Frequency spectrum represented at an enlarged scale in the region of the carrier frequency.

under the US 8,004,274 B2 heading:

INDUCTIVE POSITION SENSOR

The invention relates to an inductive position sensor which can be configured particularly as a rotational angle sensor. However, the invention can be used also in a linear position sensor.

BACKGROUND

For a large variety of technical reasons and for quite different purposes, it may be required to detect the position of moving elements or parts of a component by use of measurement technology. As examples for the use of an inductive rotational angle sensor, there could be mentioned—in the field of automobiles—the detection of the position of the accelerator, the throttle valve and the steering wheel. The advantage of inductive sensor systems resides in the contactless detection of a path position or rotational position.

Figure 1:
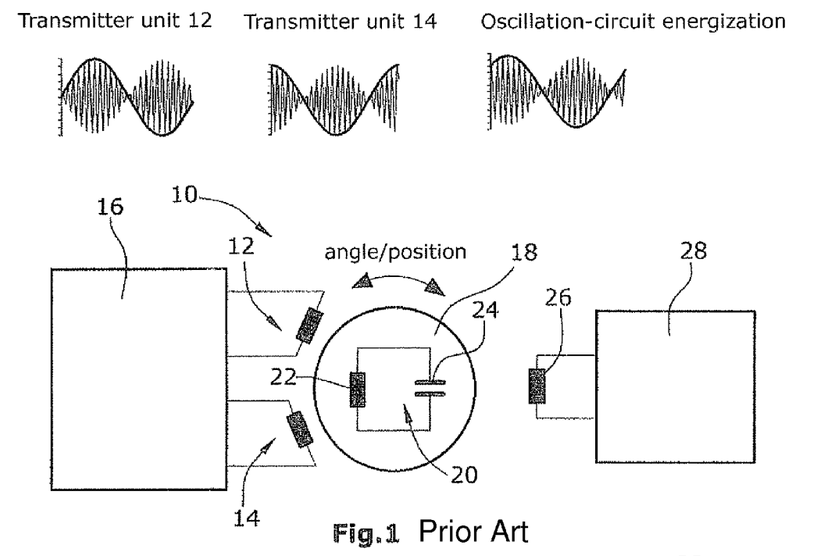
FIG. 1 is a view illustrating the basic principle of an inductive position sensor with one channel.

The invention is related specifically to inductive position sensors as schematically depicted by way of example in FIG. 1 and described, for instance, in WO-A-2004/072653 and WO-A-2003/067181. Shown in this Figure is a one-channel position sensor of the inductive type for use as a rotational angle sensor.

Said sensor 10 comprises two transmitter units 12,14 in the form of transmitter coils, each of the coils generating an electromagnetic alternating field with a site-dependent amplitude. The two transmitter units 12,14 are controlled by a control unit 16 as will be described further below.

Sensor 10 is further provided with a movable element 18 which in this example is formed as a rotary disk or another type of rotating element. Said element 18 comprises an oscillating circuit 20 including an inductance 22 and a capacitance 24. The element 18 and respectively the oscillating circuit 20 are provided to rotate within a total electromagnetic alternating field which is generated by the mutual overlap of the two electromagnetic alternating fields of both transmitter units 12,14. Depending on the rotational position, oscillating circuit 20 will produce an electromagnetic alternating field having the same frequency as the alternating fields of the two transmitter units 12,14, wherein the alternating field produced by oscillating circuit 20 is shifted in phase relative to the two other alternating fields. The degree of the phase shift is a measure of the present rotational position of element 18. The signal of oscillating circuit 20 is received by a receiving unit 26 formed as a receiver coil, and the received signal is processed in an analysis unit 28; particularly, the phase position of this signal relative to the signals fed to the transmitter units 12,14 will be determined.

The transmitter coils and respectively transmitter units 12,14 will modulate low-frequency oscillations of the same frequency onto a carrier signal which is identical for both transmitter coils. The modulated oscillations of the two transmitter coils are phase-shifted by 90° relative to each other. Both trans-mission signals will energize the LC oscillating circuit 20. The strength of the excitation is proportionate to the coupled inductivity between the respective transmitter coils and the oscillating-circuit coil (inductance 22). Depending on the position of the movable element 18, each transmission signal will be coupled with a different strength into oscillating circuit 20. Within oscillating circuit 20, a modulated oscillation is generated which has the same frequency as the transmitted modulation signal. Relative to the transmitted modulation, the modulated oscillation of oscillating circuit 20 will have a phase shift which is dependent on the amplitude ratio of the modulation signals—coupled into oscillating circuit 20—of the transmitter coils. The signal generated in oscillating circuit 20 is passed on to the receiver coil (receiver unit 26), as already mentioned above.

The mathematical approach on which the measuring principle is based, can be outlined as follows. When two sinusoidal oscillations of the same frequency which are phase-shifted by 90° relative to each other, are added to each other, a sinusoidal oscillation of the same frequency will be generated. The phase shift of the generated oscillation is a function of the amplitude ratio between the two added oscillations.

Figure 2:
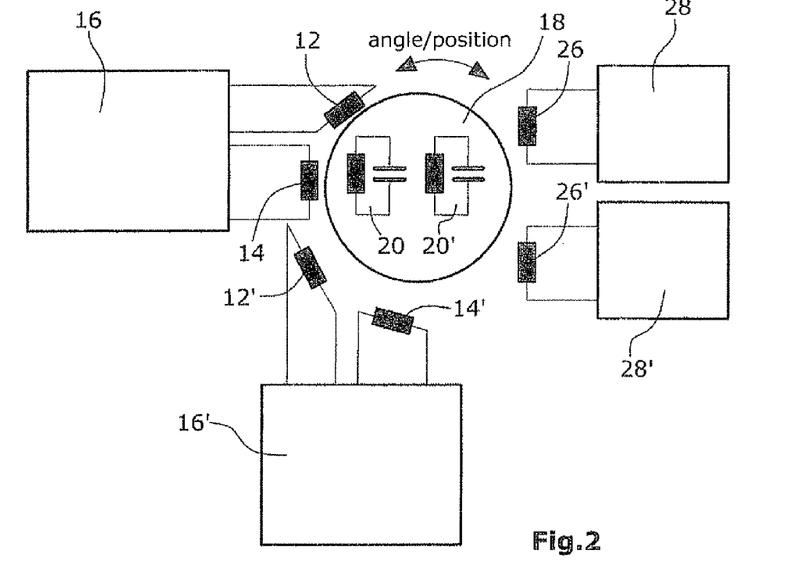
FIG. 2 is a view illustrating the basic principle of an inductive position sensor with two channels.

For many uses, a two-channel inductive position sensor will be required. In such a sensor, the sensor arrangement shown in FIG. 1 is provided twice. There is no separation between the two sensor arrangements; both channels are coupled into each other. Such a two-channel inductive sensor is shown e.g. in FIG. 2. In FIG. 2, those elements of the second channel which are identical to the elements of the one-channel sensor according to FIG. 1, are marked by the same reference numerals but provided with a prime. A further two-channel inductive sensor is described e.g. in US-A-2002/0179339.

The known inductive sensors of the above design have been basically found useful in practice. However, for certain uses, the current consumption of such sensors is occasionally too high. Further, since no sine or cosine signals are used at the input side, which is of advantage for an effective use of the system, a quite considerable post-processing expenditure in the form of filtration processes and the like will be necessitated at the output side, which is also not desirable and will increase the space requirement on an ASIC.

Known from US-A-2005/0030010 is an inductive position sensor of the type mentioned and described above which is operated with a PWM signal as a modulation signal. Also this sensor requires an increased expenditure for signal post-processing, rendering the overall arrangement more complicated. For the filtration of the modulation signal so as to obtain the sine or cosine development, a low-pass filter with relatively low limiting frequency will be required, which entails the need for additional circuit components and thus causes an increased space requirement in the ASIC.

SUMMARY OF INVENTION

The invention provides an inductive position sensor and particularly a rotational angle sensor wherein the oscillating circuit energization is improved, which sensor shall have improved functional properties and shall produce more-reliable results.

According to the invention, to achieve the above object, there is proposed an inductive position sensor, in particular a rotational angle sensor, comprising two first transmitter units for the generation of two site-dependent first alternating fields having the same carrier frequency, at least one oscillating circuit arranged in or on an element which may be moved within the total alternating field and the position of which is to be determined, the oscillating circuit being adapted to be energized by the total alternating field and generating an oscillating-circuit alternating field having the same carrier frequency as that of the first alternating fields, at least one receiver unit receiving the oscillating-circuit alternating field, and an analysis unit for determining the phase shift between the oscillating-circuit alternating field and at least one of the two first alternating fields, the two first alternating fields each being adapted to be generated by a carrier frequency signal on which substantially identical, substantially 90° phase-shifted modulation signals are modulated, each carrier frequency signal being adapted to be generated by application of a square-wave alternating voltage to the first transmitter units, the repetition frequency of said voltage being equal to the carrier frequency, the modulation signal being a pulse density signal having a pulse density changing over time for generation of a signal development having a substantially sine or cosine wave form, and the square wave signal being applied to the first transmitter units respectively for the duration of the pulses of the pulse density signal.

Figure 3:
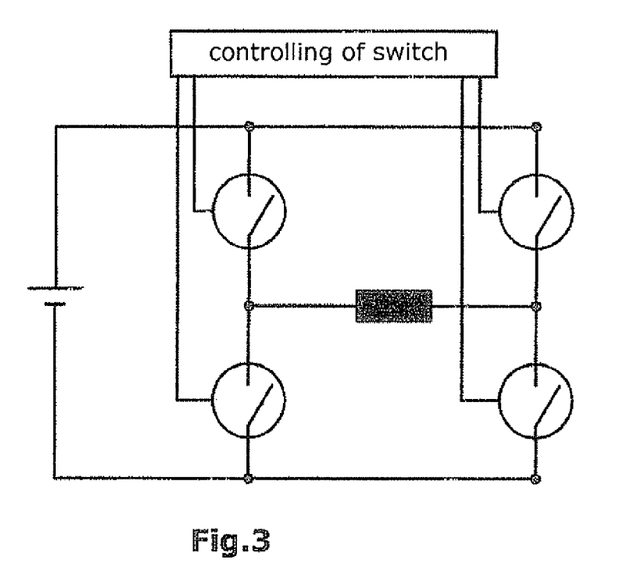
FIG. 3 is a view illustrating a circuit concept for energizing a transmitter coil in an H-bridge-circuit.

The starting point of the invention resides in the configuration of a one- or two-channel sensor as exemplified in FIGS. 1 and 2. The invention sets out from the generating of the signals for the transmitter units and coils, respectively. According to the invention, the signal for each of the transmitter units is generated as a pulse density signal which, for certain time periods which follow each other regularly, is alternately conducted to the transmitter units. Via a so-called H-bridge comprising electronic switches and a transmitter coil located in the bridge arm, the square-wave alternating signal is applied to the transmitter coil (see FIG. 3). Such circuit concepts and control processes for the switches by use of pulse density signals are generally known. According to the invention, the pulse density signal method for generating the desired (ideal or approximate) sine and cosine signals is used for both transmitter units of each channel of an inductive position sensor. The term "approximate" in the context of the invention is to be understood in the sense of a sine or cosine shape which is equal to a triangular or trapezoidal function or a step function, or is generated by superposition of a plurality of these functions. The pulse density signals are obtained e.g. by applying the desired modulation signal to the input of a sigma/delta converter, or by applying the signal by use of another mathematical model for generating a pulse density signal, so that, at the output, one will obtain the appertaining pulse density signal and the appertaining density sequence of pulse signals. Instead of using a sigma/delta converter or another converter, the pulse density signal can also be generated using a reproduction of a sigma/delta converter, i.e. using a mathematical model of this converter. The pulse density signal is stored in an ASIC, for instance.

The pulse density signal which according to the invention is used as a modulation signal comprises a sequence of identical widths, the interval between these pulses being variable and depending on the size of the signals. The larger the present signal value is, i.e. the larger the function value of the sine or cosine function is, the closer the pulses of the pulse density signal will follow each other. A pulse density signal must be distinguished from a pulse-width-modulated (PWM) signal wherein the starting points of the pulses are equally spaced from each other in time but are variable in width.

According to the invention, it is provided that two first transmitter units will generate two first alternating fields (electromagnetic alternating fields) with respectively one carrier frequency and one site-dependent amplitude, wherein both alternating fields are phase-shifted relative to each other by 90°. The carrier frequency and the site-dependency of both alternating fields are substantially equal. Within the total alternating field resulting from the superposition of the two first alternating fields, a first oscillating circuit is provided which is arranged in or on a movable element (e.g. a rotating disk or the like). The oscillating circuit comprises an inductance and a capacity. Depending on the coupling of the inductance with the overall alternating field, the oscillating circuit will emit an oscillating-circuit alternating field whose temporal development is phase-shifted relative to the two first alternating fields. On the basis of this phase shift, it will then be possible to detect the current position of the movable element having the oscillating circuit arranged thereon or therein.

The square-wave alternating signal is preferably not applied to the transmitter units over the whole period of the carrier frequency. Particularly, it is provided according to the invention that the square-wave alternating signal is passed on to the transmitter units and respectively their transmitter coils for substantially a half or a quarter of the period length of the carrier frequency. In this manner, the losses can be minimized, which is of particular relevance in systems where optimum use of energy sources is imperative. This variant of the invention is applicable also inductive sensor systems wherein the generation of pulse density signals is based on other signal shapes than that of sine or cosine signals, e.g. on square-wave signals.

Using a pulse density signal for the modulation signal instead of using the PWM signal as per se known in inductive sensors, offers several advantages. Thus, for instance, by use of pulse density signals, the signals to be produced for supply to the transmitter units can be digitally generated with greater precision. In low-pass filtering, only those repetition frequencies of the pulses have to be filtered out which are by orders of magnitudes larger than the modulation frequency which is normally in the MHz range, so that the low-pass filter does not have to operate all too selectively and can have a relatively high limiting frequency which is by orders of magnitudes higher than the modulation frequency. Filters of this type can be realized by relatively few filter components so that also little space will be required in a ASIC for realizing the filter. On the whole, the use of a pulse density signal as a modulation signal will allow for a simple digital realization with high detection accuracy and low expenditure for circuitry so that the overall signal-processing circuit can be produced at low cost.

According to an advantageous variant of the invention, it is further provided that the inductive position sensor comprises also a second channel, i.e. has two second transmitter units which in turn generate two alternating fields with the same carrier frequency and site-dependency of their amplitudes. Inductive position sensors of this type are generally known. The redundancy of the channels will result, inter alia, in an improved operational safety.

When, while using pulse density signals for generating the alternating fields which particularly have a sine or cosine development, operation is performed with reduced pulse widths as described above with regard to the invention, this will entail the problem that a channel and respectively the oscillating circuit of said channel will also be energized by the pulse density signal for the other alternating fields. The first and the second alternating fields have different carrier frequencies. For generating the alternating fields of the lower carrier frequency, use is made of square-wave pulse voltages which are applied to the second transmitter units for the full duration of the period of the carrier frequency. The frequency spectrum of these square-wave pulse signals includes a minimum in which the carrier frequencies of the other two alternating fields are located. In the presently described variant of the invention, the two first alternating fields have a higher carrier frequency than the two second alternating fields. Particularly, the carrier frequency of the two first alternating fields is located near (namely above and below) the second harmonic, i.e. twice the value of the carrier frequency of the second alternating fields, and specifically in a range where the frequency spectrum of the square-wave alternating signal for the two second transmitter units comprises a minimum.

The modulation signals for the two second transmitter units can be equal to the modulation signals for the two first transmitter units.

In this variant of the two-channel position sensor, the oscillating circuit with the lower carrier frequency is energized by the full pulse width while the other oscillating circuit, i.e. the oscillating circuit with the higher carrier frequency, is energized by a reduced pulse width as described above.

An alternative to the above described control of the two channels of an inductive position sensor resides in that, for one channel, a pulse density signal is used whose frequency spectrum will at the frequency of the other channel have a distinct minimum and a zero point, respectively. Such minima or zero points are advantageously existent at other frequencies so that the carrier frequencies for further oscillating circuits of the inductive position sensor (e.g. in variant with two or more channels) can be located there.

The invention further relates to the use of pulse density signals for the generating of a sine or cosine function for the transmitter units of an inductive position sensor as defined in claim 1.

In this regard, it is particularly suitable to use a pulse density signal wherein the near harmonics in the range of respectively up to 100 kHz above and below the carrier frequency are attenuated by up to at least 35-40 dB. In a two-channel position sensor, it is of particular advantage if, for the two first transmitter units, there is used a pulse density signal wherein the near harmonics of respectively 0 to 200 kHz above and below the first carrier frequency are attenuated by up to 30 dB and wherein the frequency portions at the second carrier frequency and within a range of at least +/−4% around the second carrier frequency are attenuated by up to at least 10 dB.

In the first above-described alternative of the pulse density signal, this signal undergoes such a strong attenuation in the frequency spectrum on both sides of the carrier frequency in the range of 0-100 kHz that a low-pass filtering of the harmonic near the carrier frequency can be omitted. By selecting the pulse density signal according to the second alternative, it is possible to suppress an interference of the two pulse density signals at the two carrier frequencies of the two channels since, in the frequency spectrum of the first pulse density signal, the attenuation of the frequency portions around the second carrier frequency is already relatively high, i.e. at least 10 dB. The attenuation of the harmonics near the first carrier frequency is at least 30 dB.

Using the invention, it is possible to generate a sinusoidal modulation quite precisely. For this purpose, special, newly developed modulation signals will be used which are provided as a bit string for use in a sigma/delta converter.

BRIEF DESCRIPTION OF THE DRAWINGS

The invention will be explained hereunder by way of several embodiments thereof and with reference to the drawing. In particular, the following is shown in the drawings.

DETAILED DESCRIPTION

The exemplary embodiments described herein relate to the generating of the sine and cosine, amplitude-modulated energizing alternating fields for at least two oscillating circuits of an inductive position sensor having one or more channels as shown in FIGS. 1 and 2.

The exemplary embodiments relate to the controlling of the transmitter coils of a multi-channel inductive position sensor, notably both with respect to the carrier signal and with respect to the modulation signal.

Generation of the Carrier Frequency

For the transmission of information, a low-frequency signal, e.g. in the kHz range, which contains the information, will be modulated upon a high-frequency carrier signal, e.g. in the MHz range.

The carrier frequency is generated by conventional application of a square-wave voltage U to the transmitter coil. The current flow $i_L$ through the coil will then follow the development of an e-function.

$$i_L = \frac{U}{R} \cdot \left(1 - e^{\frac{t}{\tau}}\right) \text{ wherein } \tau = \frac{L}{R}$$

To be able to reduce $i_L$, the voltage U across the coil can be reduced. For typical inductances L of the transmitter coils, however, t>y will hold true further on.

Example

L=300 nH
R=4 Ohm
$F_{carrier}$=4 MHz
T=75 ns
T=½*$T_{cyc,carrier}$=125 s

The voltage induced in the receiving coil is proportionate to the change of the magnetic flux dφ/dt. The change of the magnetic flux dφ/dt is proportionate to the change of the transmitting current $di_L$/dt. Thus, when the transmitting current reaches its final value $i_L$=U/R, then $di_L$/dt=0. The constant current which continues to flow will not contribute to an increase of the transmission signal.

Figure 4:
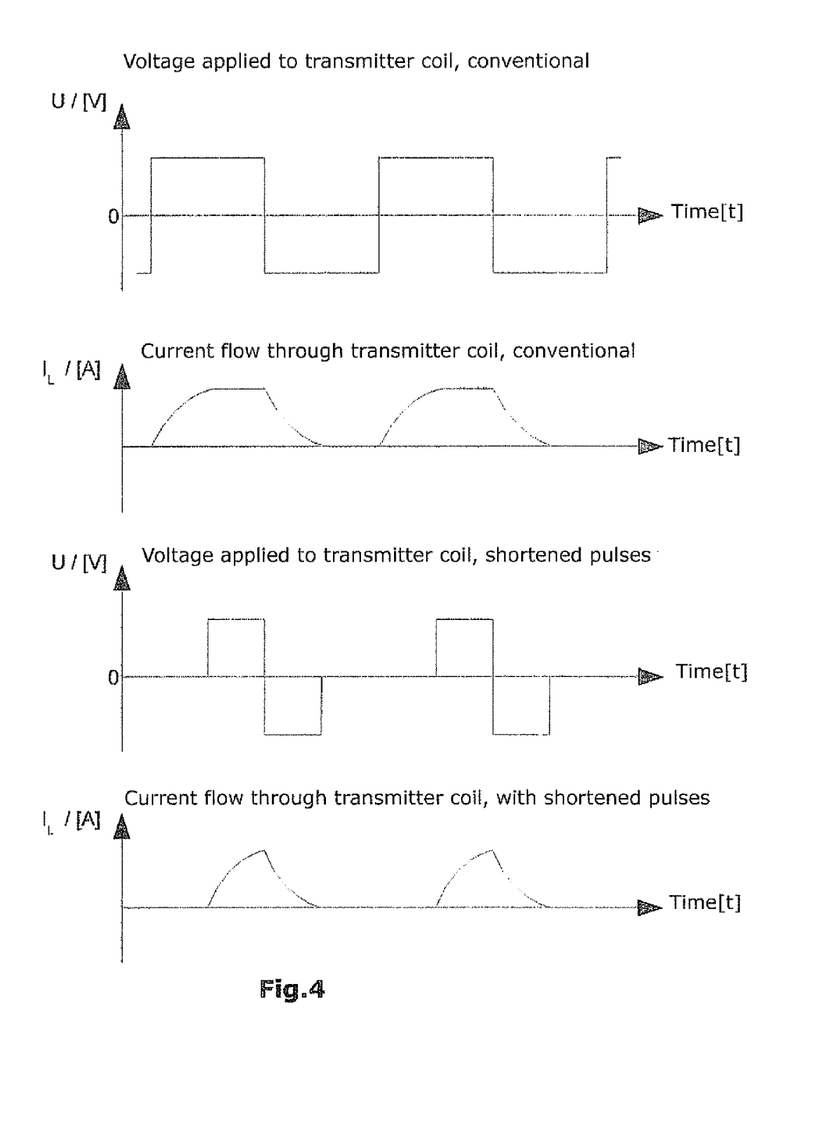
FIG. 4 is a comparative view illustrating the various ways of controlling the carrier frequency of the transmitter coils.

The novel feature according to a first exemplary embodiment of the invention consists in reducing the width of the square-wave pulse of the voltage U applied to the transmitter coil. Thus, it is not during the whole cycle time that current will flow through the transmitter coil. Thus, the current flowing through the coil is reduced. Further, it is avoided that the maximum current $i_L = U/R$ is reached (see FIG. 4).

Generation of the Modulation Signal (Second Embodiment)

Inductive sensors wherein the angle position or linear position is a function of the phase shift between the transmitted and the received modulation signal, require
- a constant phase difference of the modulation signals
- equal amplitudes of the modulation signals
- good formation of the desired modulation signal.

Figure 5:
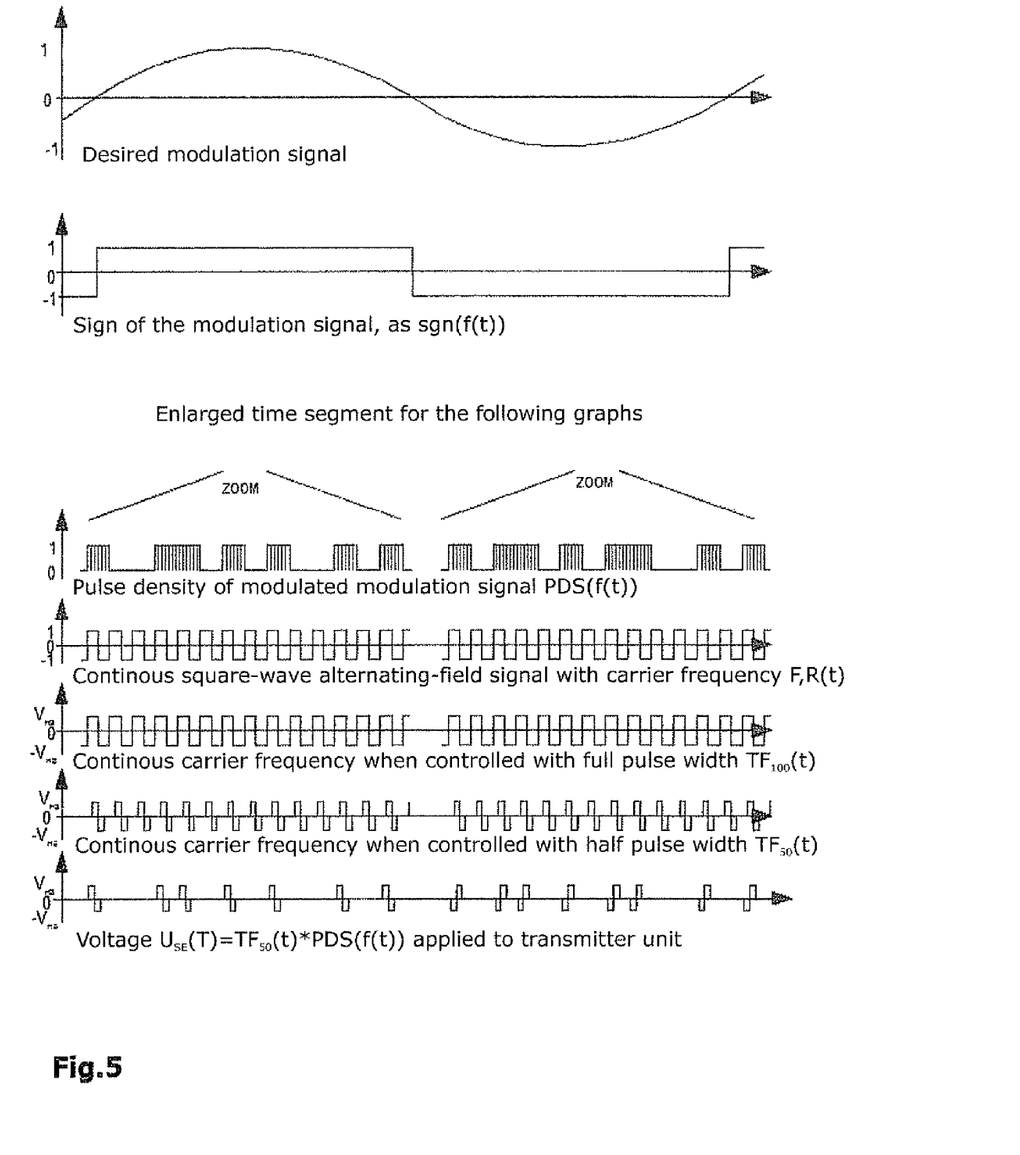
FIG. 5 shows graphic representations of diverse signal developments over time during the generation of the pulse density signal and the controlling of the transmitter coil on the basis of the pulse density signals.

The mathematical approach presented farther above for two oscillations of the same frequency shifted by 90° relative to each other holds true only for ideal sine and respectively cosine curves. In practice, however, one has as of yet used only two square-wave signals shifted by 90° relative to each other. This will require a strong low-pass filtering in the receiver portion so that the corresponding sinusoidal signals can be filtered out from the square-wave signals. This causes the following disadvantages:
- necessity of filters with low frequency (intensive space requirement)
- temperature-dependency of the low-pass filtering A distinct improvement is obtained when using a pulse density signal which reproduces the desired modulation signal. This pulse density signal can be generated in a very elegant manner with the aid of a mathematical model of e.g. a sigma/delta converter. The desired modulation signal will be applied to the input of this model, and the corresponding pulse density signal will be obtained at the output. This signal can then be simply converted with merely little space requirement in the hardware. Thus, it is not necessary to integrate a sigma/delta converter into the system. By the use of a pulse density signal which corresponds to a sine function, the required low-pass filtering is noticeably reduced since the pulse density signal does already describe the desired sinus development quite precisely. The development of the desired modulation signal, the sign function thereof, and the developments of the pulse density signal representing the modulation signal, of the carrier frequency and of the square-wave voltage for the transmitter coils are shown in FIG. 5.

The pulse density signal offers a further advantage in systems where it is imperative to generate two modulation signals which are in a specific relation to each other. Since the pulse density signal is a fully digital signal and, in the normal case, the desired modulation signals are generated by a common oscillator, the modulation signals will fit to each other very well, i.e. they will have (exactly) the required phase shift of 90° and will be identical with each other with regard to the amplitude and the shape of the curve.

Selection of the Transmission Frequencies

Figure 6:
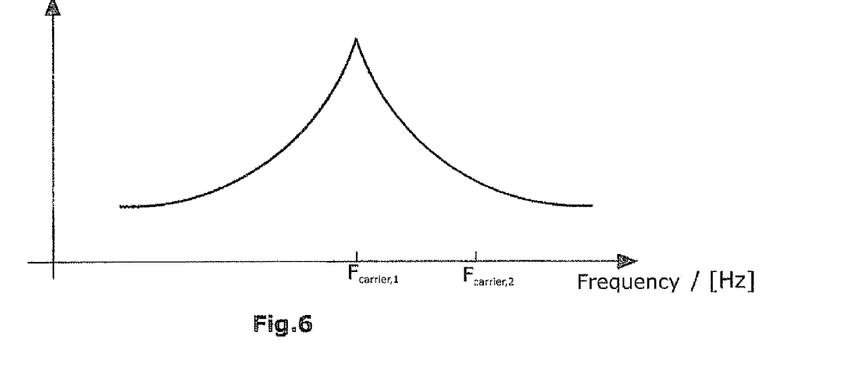
FIG. 6 shows a schematic representation of the envelope of the frequency spectrum in the conventional square-wave modulation.

The above presented square-wave signal has a spectrum in the frequency range which is different from the spectrum of a square-wave signal. A square-wave signal has a distinct peak at the used carrier frequency, and a considerably dropping spectrum towards higher and lower frequencies. FIG. 6 shows the spectrum of a carrier signal of the frequency $F_{carrier,1}$ onto which a square-wave signal is modulated.

Figure 7:
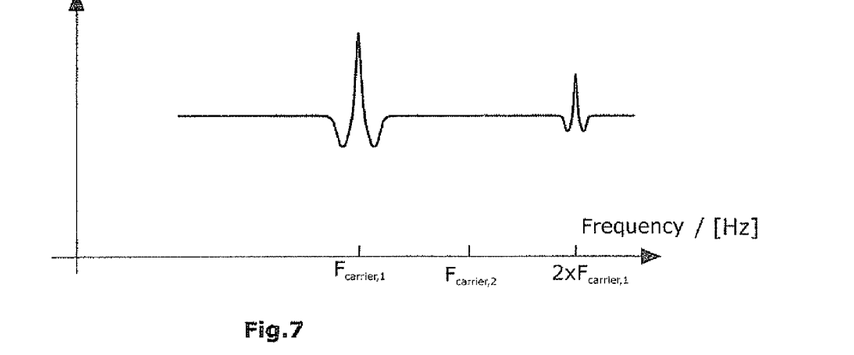
FIG. 7 shows a schematic representation of the envelope of the frequency spectrum for the use of a pulse density signal with reduced pulse width.

The frequency spectrum of a pulse density signal will also have a peak at the used carrier frequency but will not drop all too massively towards other frequencies. Thus, in sensors comprising plural channels, a danger exists that the oscillating circuits belonging to other channels are energized as well. FIG. 7 shows the spectrum of a carrier signal of the frequency $F_{carrier,1}$ onto which a pulse density signal is modulated. In this case, use is made again of the reduction of the pulse width described farther above.

Figure 8:
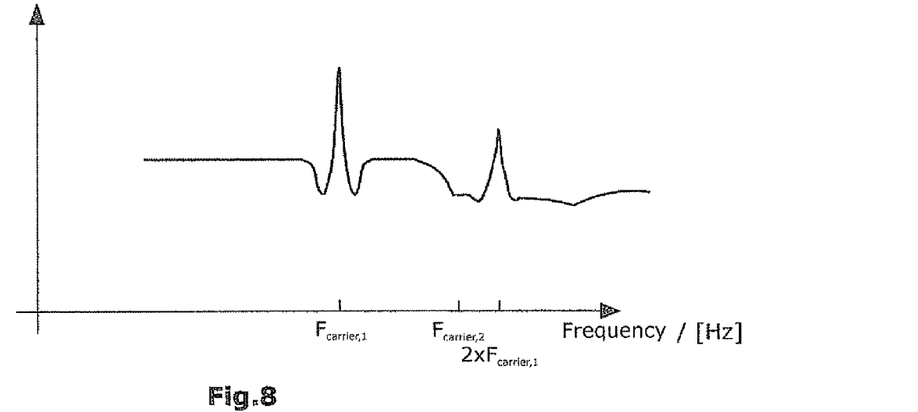
FIG. 8 shows a schematic representation of the envelope of the frequency spectrum for the use of a pulse density signal with full pulse width.

Without a reduction of the pulse width (i.e. with the full pulse width), however, the spectrum of the pulse density signal for higher frequencies will change. The spectrum will drop towards higher frequencies and will reach a first minimum before the second harmonic (twice the carrier frequency) (see FIG. 8).

To make it possible, in sensors comprising plural channels, to minimize the energization of another channel, it is according to this embodiment provided that the carrier frequency of the other channel is set to the minimum of the spectrum. Further, for the channel with the lower carrier frequency, the full pulse width is to be used.

Alternative Generation of the Modulation Frequency (Third Embodiment)

Figure 9:
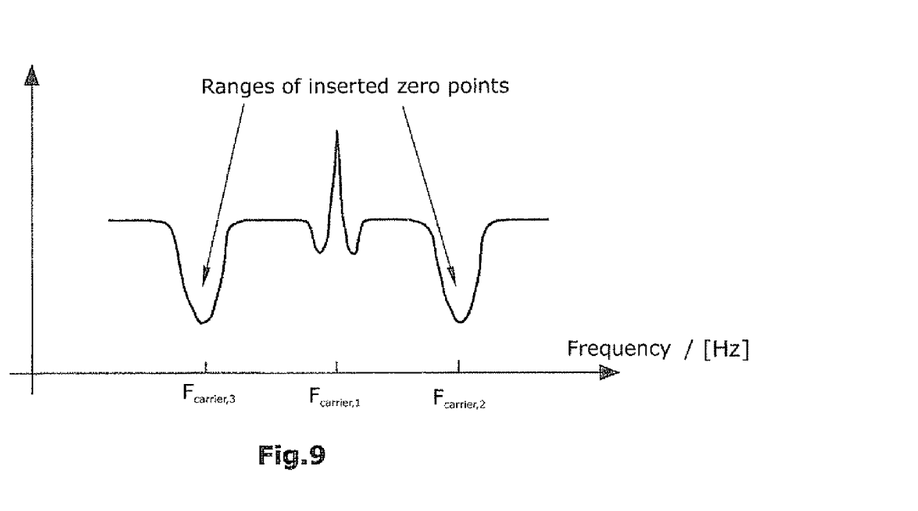
FIG. 9 shows a schematic representation of the envelope of the spectrum for the use of a pulse density signal with included zero points.

The above outlined problems which arise when using a pulse density signal, can be avoided by a "more intelligent" pulse density signal. In this case, the pulse density signal is to be selected in such a manner that its spectrum is strongly attenuated in the range of the one or plurality of other carrier frequencies. If this pulse density signal is generated also by use of a mathematical model of a sigma/delta converter or another mathematical model for generating a pulse density signal, additional zero points have to be inserted into the transmission function. FIG. 9 shows a possible spectrum for a modulated pulse density signal with additional introduced zero points in the frequency range.

For explanation of the novelty of the invention, i.e. the use of pulse density signals as an approximation of a digitally generated sinusoidal modulation, reference is made hereunder to FIGS. 10-18.

Figure 10:
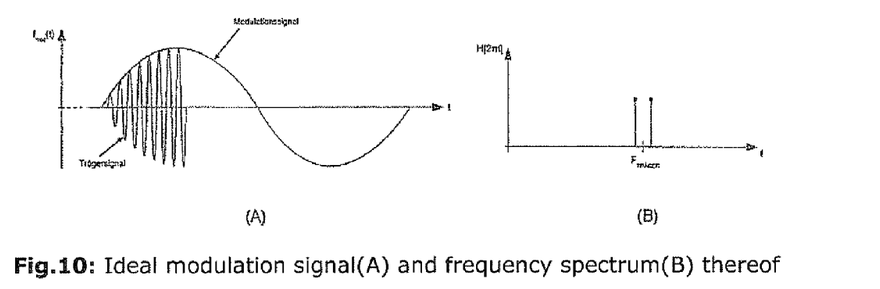
FIGS. 10-18 illustrate modulation signals according to the state of the art and according to the invention in the temporal and the frequency range for contrasting the invention and an ideal sinusoidal modulation.

FIG. 10 shows the ideal modulation signal modulated onto an ideal carrier (A) and the appertaining frequency spectrum (B).

Figure 11:
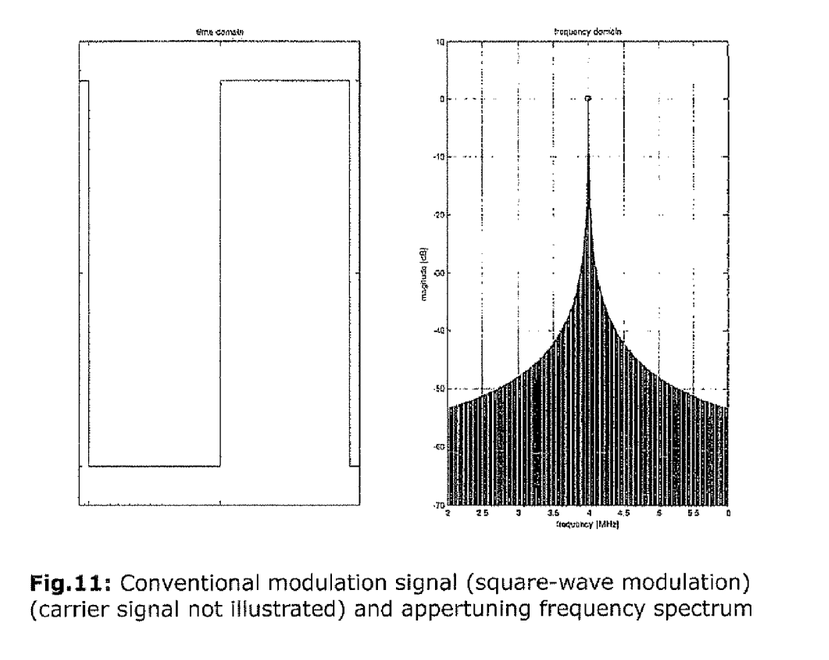

FIG. 11 shows a conventional modulation signal for square-wave modulation. For reasons of clarity, the carrier signal is not represented. Often, the modulation signal is reduced to only a half-wave of the square-wave signal.

Figure 12:
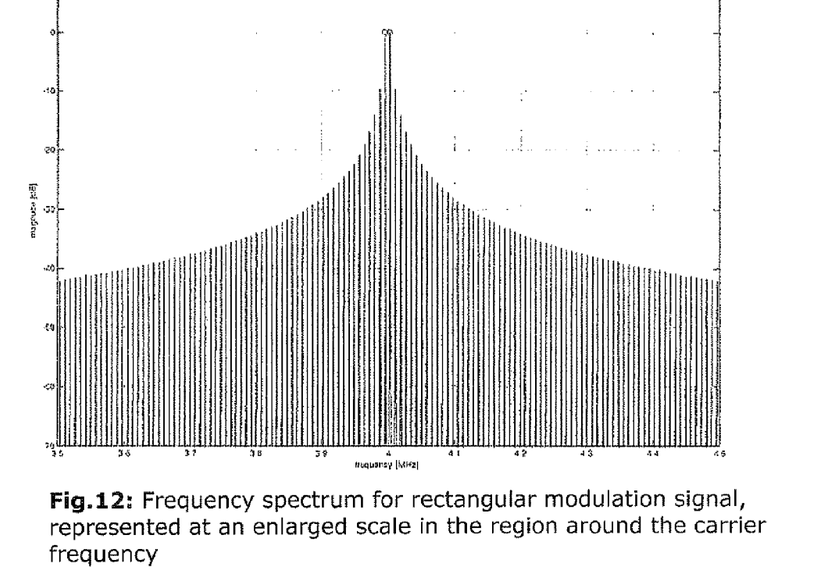
Figure 13:
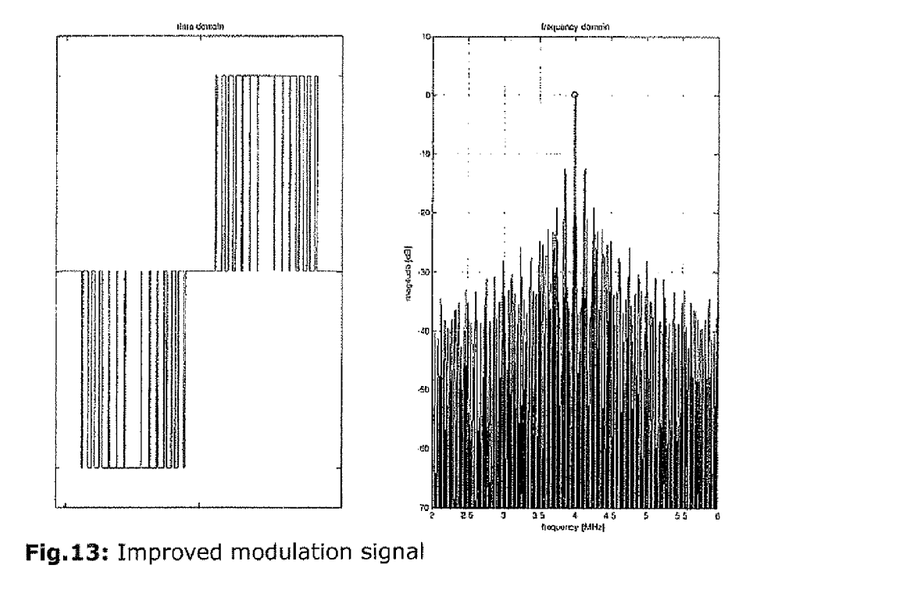
Figure 14:
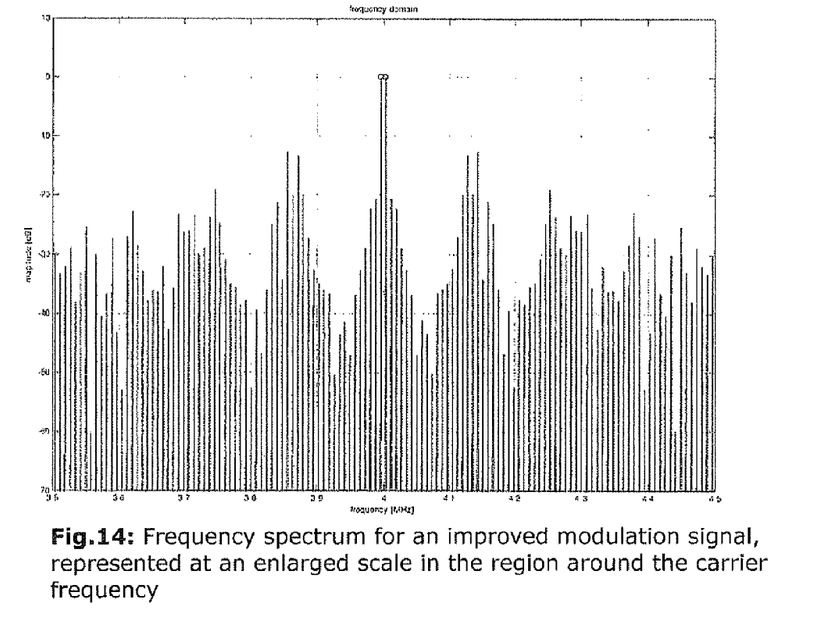

FIG. 12 is an enlarged representation of the frequency spectrum according to FIG. 11. It can be seen that the harmonic near the carrier frequency is attenuated only minimally.

Both in square-wave modulation (FIGS. 11 and 12) and in the improved modulation signal (FIGS. 13 and 14), the enlarged representation of the frequency range clearly shows the harmonics of the modulation signal (attenuation by about 20 dB). A more-intensive low-pass filtering of this harmonic will be necessary.

Figure 15:
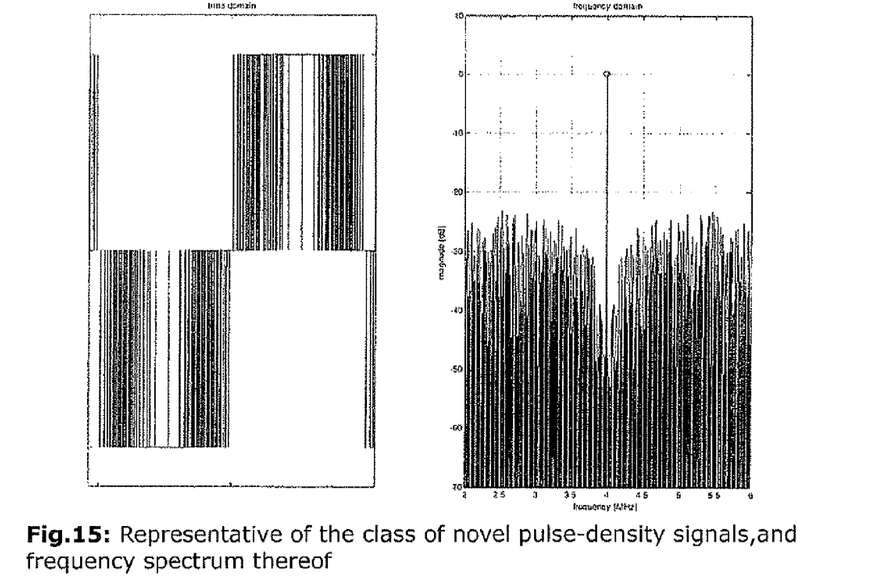
Figure 16:
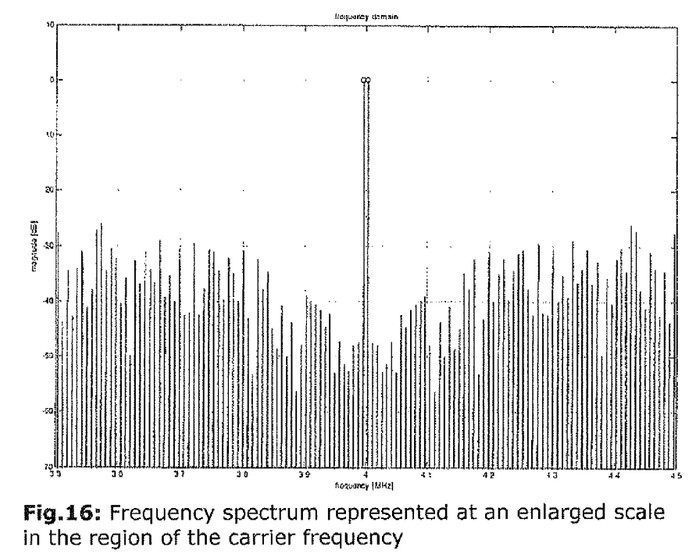
Figure 17:
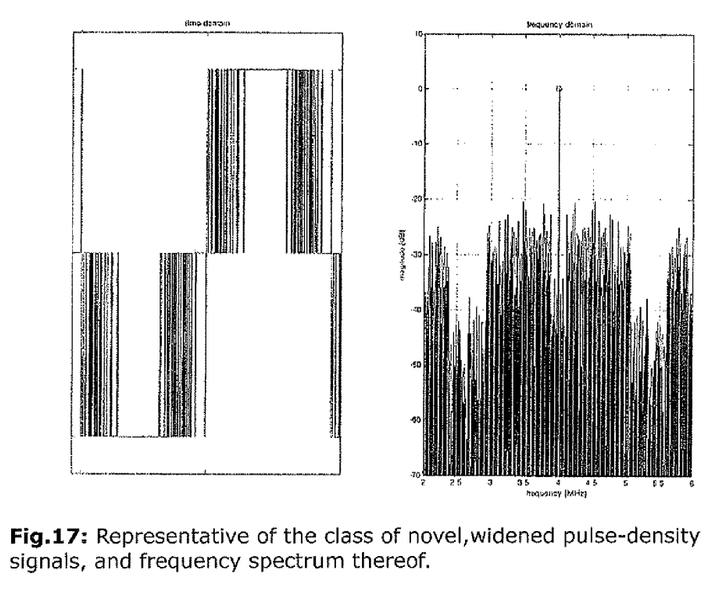
Figure 18:
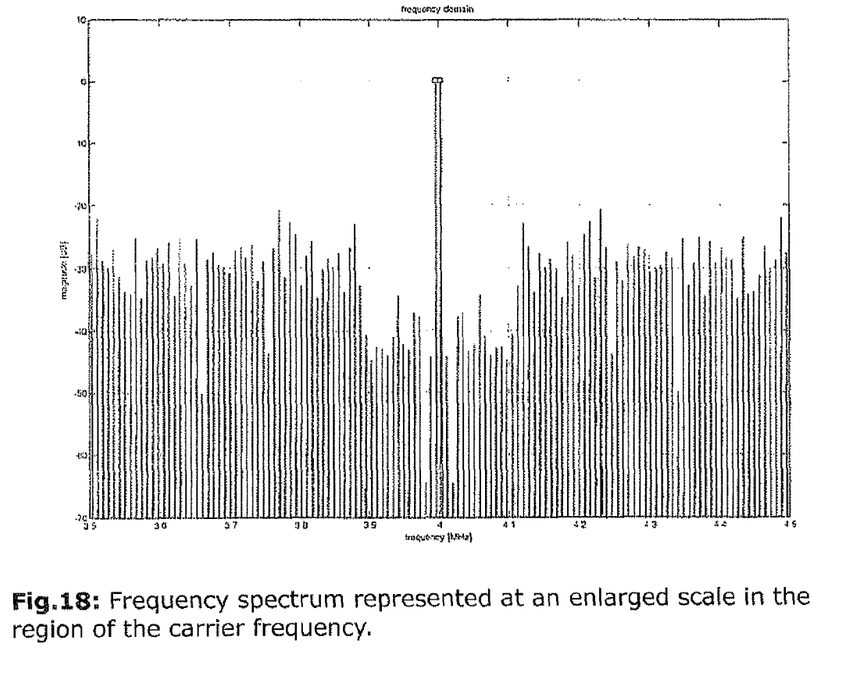

In the novel pulse density signal, the harmonic (around the carrier frequency of 4 MHz in this exemplary embodiment) is attenuated by about 40 dB (see FIGS. 15 and 16). A low-pass filtering of the harmonic will not be necessary. The development over time of this pulse density signal is shown in FIG. 15 (left side).

Further, the novel widened pulse density signal (see FIGS. 17 and 18) has a minimum in the range of a freely selectable second carrier frequency (second channel). This minimum is at least 10 dB below the adjacent noise carpet and has a width of at least +/−4% around the second carrier frequency which in this embodiment is at about 2.7 MHz, with the first carrier frequency being 4 MHz.

To sum up, the essential features of the invention according to the above described three exemplary embodiments can be outlined as follows:

Shortened transmission pulses for generating the carrier frequency so as to save power Generation of a modulation signals by a pulse density signal Selecting the carrier frequencies so as to attenuate parasitic effects by means of the pulse density signal Generation of a modulation signal by a more-intelligent pulse density signal which does already include an attenuation of the parasitic effects.

As a result, the inductive position sensor has the following properties:

improved oscillating circuit energization by use of a pulse density signal for a sine or cosine signal or for a signal approximated to these curve shapes by use of a triangular, trapezoidal or step signal or by superposition of a plurality of such signals, linearity of the change of the output signal over the position of the element comprising the oscillating circuit or the oscillating circuits, generation of two modulation signals with the largest possible phase shift and with identical curve shapes for each pair of transmitter units, substantially temperature-independent behavior of the sensor, integration of the control of the transmitter units onto a semiconductor chip (ASIC) possible while requiring relatively little space.

The invention claimed is:

1. An inductive position sensor, comprising
two first transmitter units for the generation of two site-dependent first alternating fields that form a total alternating field having the same carrier frequency,
at least one oscillating circuit arranged in or on an element movable within the total alternating field and the position of which is to be determined,
the oscillating circuit being energized by the total alternating field for generating an oscillating-circuit alternating field having the same carrier frequency as that of the first alternating fields,
at least one receiver unit that receives the oscillating-circuit alternating field, and
an analysis unit that determines the phase shift between the oscillating-circuit alternating field and at least one of the two first alternating fields,
wherein the two first alternating fields are generated by a carrier frequency signal on which substantially identical, substantially 90° phase-shifted modulation signals are modulated,
wherein each carrier frequency signal is generated by application of a square-wave alternating voltage to the first transmitter units, the repetition frequency of said voltage being equal to the carrier frequency,
wherein the modulation signal is a pulse density signal having a pulse density changing over time for generation of a signal development having a substantially sine or cosine wave form, and
wherein the square wave alternating voltage is applied to the first transmitter units respectively for the duration of the pulses of the pulse density signal.

2. The inductive position sensor according to claim 1, wherein said square-wave alternating voltage is applied for a duration shorter than the period duration of the carrier frequency.

3. The inductive position sensor according to claim 2, wherein said square-wave alternating voltage is applied for a duration equal to or longer than half the carrier frequency.

4. The inductive position sensor according to claim 3, wherein said square-wave alternating voltage is applied for a duration equal to or longer than a quarter of the period duration of the carrier frequency.

5. The inductive position sensor according to claim 1, wherein
a second oscillating circuit is arranged in or on the movable element,
two second transmitter units are provided for the generation of two site-dependent second alternating fields overlapping each other to form a total alternating field and having the same carrier frequency, the carrier frequency of the second alternating fields being different from the carrier frequency of the first alternating fields, and the carrier frequency of the first alternating fields is close to the second harmonic, and is in a range in which the frequency spectrum of the development of the square-wave alternating voltage for the two transmitter units comprises a minimum, and
wherein the second alternating fields are generated by the two transmitter units by a carrier frequency signal on which the same, 90° phase-shifted modulation signals are modulated,
wherein the modulation signal is a pulse density signal having a pulse density changing over time for generation of a signal development having a substantially sine or cosine wave form, and
wherein the period duration of the square-wave alternating voltage for the second transmitter units is equal to the period duration of the carrier frequency of the second alternating fields.

6. The inductive position sensor according to claim 5, wherein the carrier frequency of the first alternating fields is close to twice the value of the carrier frequency of the second alternating fields.

7. The inductive position sensor according to claim 1, wherein
a second oscillating circuit is arranged in or on the movable element,
two second transmitter units are provided whose alternating fields have the same carrier frequency among each other, the carrier frequency of the alternating fields of the second transmitter units being different from the carrier frequency of the alternating fields of the first transmitter units,
the second alternating fields are generated by applying to the second transmitter units a carrier frequency signal on which the same, 90° phase-shifted modulation signals are modulated,
wherein each modulation signal is a pulse density signal having a pulse density changing over time for generation of a signal development having a substantially sine or cosine wave form, and
wherein the development of the square-wave alternating voltage for the two transmitter units for generating the alternating fields with the lower carrier frequency has a frequency spectrum which at the higher one of the two carrier frequencies comprises a minimum and preferably a zero point, and the development of the square-wave alternating voltage for the two other transmitter units for generating the alternating fields with the higher carrier frequency has a frequency spectrum which at the lower one of the two carrier frequencies comprises a minimum and preferably a zero point.

8. An inductive position sensor, comprising
two first transmitter units for the generation of two site-dependent first alternating fields having the same carrier frequency,
at least one oscillating circuit arranged in or on an element movable within the total alternating field and the position of which is to be determined,
the oscillating circuit being energized by the total alternating field for generating an oscillating-circuit alternating field having the same carrier frequency as that of the first alternating fields,
at least one receiver unit that receives the oscillating-circuit alternating field, and
an analysis unit that determines the phase shift between the oscillating-circuit alternating field and at least one of the two first alternating fields,
wherein the two first alternating fields are generated by a carrier frequency signal on which substantially identical, substantially 90° phase-shifted modulation signals are modulated,
wherein each carrier frequency signal is generated by application of a square-wave alternating voltage to the first transmitter units, the repetition frequency of said voltage being equal to the carrier frequency, and
wherein the square-wave alternating voltage is applied for a duration shorter than the period duration of the carrier frequency, and
wherein said square-wave alternating voltage is applied for a duration equal to or longer than half the carrier frequency.

9. The inductive position sensor according to claim 1, wherein the inductive position sensor is a rotational angle sensor.

10. A method of using a pulse-density signal having a pulse density changing over time for generation of a signal development having a substantially sine or cosine wave form as a modulation signal in an inductive position sensor, wherein at least one oscillating circuit is arranged in or on an element which may be moved within the total alternating field and the position of which is to be determined, comprising
using two first transmitter units to generate two site-dependent first alternating fields having the same carrier frequency,
energizing the oscillating circuit by the total alternating field and generating an oscillating-circuit alternating field having the same carrier frequency as that of the first alternating fields,
receiving in at least one receiver unit the oscillating-circuit alternating field, and
determining in an analysis unit the phase shift between the oscillating-circuit alternating field and at least one of the two first alternating fields,
generating the two first alternating fields by a carrier frequency signal on which substantially identical, substantially 90° phase-shifted modulation signals are modulated,
generating each carrier frequency signal by application of a square-wave alternating voltage to the first transmitter units, the repetition frequency of said voltage being equal to the carrier frequency, and
applying the square-wave alternating voltage to the first transmitter units respectively for the duration of the pulses of the pulse density signal.

11. The inductive position sensor according to claim 1, wherein a pulse density signal is used in which the near harmonics in the range of respectively up to 100 kHz above and below the carrier frequency are attenuated by at least 35-40 dB.

12. The inductive position sensor according to claim 8, wherein said square-wave alternating voltage is applied for a duration equal to or longer than a quarter of the period duration of the carrier frequency.

13. The inductive position sensor according to claim 8, wherein said modulation signal is a pulse density signal having a pulse density changing over time for generation of a signal development having a substantially sine or cosine wave form.

14. The inductive position sensor according to claim 8, wherein
a second oscillating circuit is arranged in or on the movable element,
two second transmitter units are provided for the generation of two site-dependent second alternating fields overlapping each other to form a total alternating field and having the same carrier frequency, the carrier frequency of the second alternating fields being different from the carrier frequency of the first alternating fields, and the carrier frequency of the first alternating fields is close to the second harmonic, and is in a range in which the frequency spectrum of the development of the square-wave alternating voltage for the two transmitter units comprises a minimum, and
wherein the second alternating fields are generated by the two transmitter units by a carrier frequency signal on which the same, 90° phase-shifted modulation signals are modulated,
wherein the modulation signal is a pulse density signal having a pulse density changing over time for generation of a signal development having a substantially sine or cosine wave form, and
wherein the period duration of the square-wave alternating voltage for the second transmitter units is equal to the period duration of the carrier frequency of the second alternating fields.

15. The inductive position sensor according to claim 14, wherein the carrier frequency of the first alternating fields is close to twice the value of the carrier frequency of the second alternating fields.

16. The inductive position sensor according to claim 14, wherein for the first transmitter units, a pulse density signal is used in which the near harmonics of respectively 0-200 kHz above and below the first carrier frequency are attenuated by up to 30 dB and in which the frequency portions at the second carrier frequency and within a range of at least +/−4% around the second carrier frequency are attenuated by at least 10 dB.

17. The inductive position sensor according to claim 8, wherein
a second oscillating circuit is arranged in or on the movable element,
two second transmitter units are provided whose alternating fields have the same carrier frequency among each other, the carrier frequency of the alternating fields of the second transmitter units being different from the carrier frequency of the alternating fields of the first transmitter units,
the second alternating fields are generated by applying a carrier frequency signal on which the same, 90° phase-shifted modulation signals are modulated,
wherein each modulation signal is a pulse density signal having a pulse density changing over time for generation of a signal development having a substantially sine or cosine wave form, and wherein the development of the square-wave alternating voltage for the two transmitter units for generating the alternating fields with the lower carrier frequency has a frequency spectrum which at the higher one of the two carrier frequencies comprises a minimum and preferably a zero point, and the development of the square-wave alternating voltage for the two other transmitter units for generating the alternating fields with the higher carrier frequency has a frequency spectrum which at the lower one of the two carrier frequencies comprises a minimum and preferably a zero point.

18. The inductive position sensor according to claim 7, wherein for the first transmitter units, a pulse density signal is used in which the near harmonics of respectively 0-200 kHz above and below the first carrier frequency are attenuated by up to 30 dB and in which the frequency portions at the second carrier frequency and within a range of at least +/−4% around the second carrier frequency are attenuated by at least 10 dB.

19. The inductive position sensor according to claim 12, wherein the inductive position sensor is a rotational angle sensor.

20. The inductive position sensor according to claim 8, wherein a pulse density signal is used in which the near harmonics in the range of respectively up to 100 kHz above and below the carrier frequency are attenuated by at least 35-40 dB.

* * * * *